United States Patent
Anumala et al.

(10) Patent No.: US 8,819,267 B2
(45) Date of Patent: Aug. 26, 2014

(54) NETWORK VIRTUALIZATION WITHOUT GATEWAY FUNCTION

(75) Inventors: Mohnish Anumala, Cupertino, CA (US); Krishnamurthy Subramanian, Mountain View, CA (US)

(73) Assignee: Force10 Networks, Inc., San Jose, CA (US)

(*) Notice: Subject to any disclaimer, the term of this patent is extended or adjusted under 35 U.S.C. 154(b) by 268 days.

(21) Appl. No.: 13/297,653

(22) Filed: Nov. 16, 2011

(65) Prior Publication Data

US 2013/0124750 A1    May 16, 2013

(51) Int. Cl.
*G06F 15/16*    (2006.01)

(52) U.S. Cl.
USPC ............... 709/232; 709/230; 709/231

(58) Field of Classification Search
None
See application file for complete search history.

(56) References Cited

U.S. PATENT DOCUMENTS

| 8,068,486 B2* | 11/2011 | Liu et al. ............... 370/389 |
| 2004/0153556 A1* | 8/2004 | Claes et al. ............ 709/229 |
| 2010/0107162 A1* | 4/2010 | Edwards et al. ........... 718/1 |
| 2011/0029645 A1* | 2/2011 | Baykal et al. ........... 709/221 |
| 2012/0014387 A1* | 1/2012 | Dunbar et al. ....... 370/395.53 |

* cited by examiner

*Primary Examiner* — Umar Cheema
(74) *Attorney, Agent, or Firm* — Haynes and Boone, LLP

(57) ABSTRACT

A local network, such as a data center, includes a plurality of servers each of which are linked to a network switch. Some of the plurality of servers are network virtualization capable and some are not. The network virtualization capable servers include functionality that encapsulates a data frame, generated by one network virtualization servers that is to be sent to another network virtualization capable server, with a network virtualization identity. In the event that a network virtualization server generates a data frame for transmission to a server that is not capable of network virtualization, the network virtualization capable server does not encapsulate the data frame with the network virtualization identity.

16 Claims, 5 Drawing Sheets

NETWORK VIRTUALIZATION WITHOUT GATEWAY FUNCTION

BACKGROUND

1. Field of the Invention

The present disclosure relates generally to network virtualization, and more particularly to a technique for eliminating the need to include a gateway function between virtualized servers and non-virtualized servers and clients in a network.

2. Description of Related Art

Servers comprising a local network can be configured to support traffic/flows associated with one or more virtual LANs (VLAN). VLANs are typically employed in networks for the purpose of, among other things, segregating tenant traffic and performance isolation. A tenant in this context can mean an entity, or a portion of an entity, that is providing some service to customers (sales, marketing, hosting, information, etc.), and each VLAN can be typically configured to support traffic associated with a single tenant. Each VLAN is identified by a tag (VLAN.ID) included in a frame of information transmitted over the VLAN, and the number of VLAN identities is currently limited to sixteen bits or 4080 separate VLANs. As the volume of traffic in a local network increases, it becomes necessary to upgrade the network's capacity to process the increased traffic. Such network upgrades can include increasing the number of physical servers and switches comprising a network, and/or it can include upgrading certain functionality associated with each server and switch in the network, such as implementing virtual server and virtual switch functionality. However, implementing virtual network devices does not solve the problem associated with the VLAN limitation described earlier.

Recently, network virtualization (NV) has been proposed as a methodology to use when upgrading a network to more efficiently support larger volumes of traffic and larger numbers of tenants. Network virtualization methods can extend the capacity of a network to support many millions of "virtual networks", and each virtual network can be utilized to support traffic associated with one tenant, but possibly more. One network virtualization technique is described in a Network Working Group Internet Draft entitled "VXLAN: A Framework for Overlaying Virtualized Layer 2 Networks over Layer 3 Networks" published in August 2011, the entire contents of which are incorporated herein by reference. This internet draft describes a virtual, extensible local area network that supports a large number of VXLAN segments, with each segment assigned a twenty four (24) bit segment ID which is referred to as a VXLAN Network Identifier (VNI). A VNI is included in a VXLAN header (outer header) that envelopes or encapsulates an inner Ethernet frame transmitted by a server (typically a VM on a server). The outer VXLAN header is attached to the inner Ethernet frame by functionality that is referred to as a virtual tunnel end point (VTEP). The twenty four bits allocated to the segment ID permits up to 16M VXLAN segments to be configured within a local network, such as a data center, and the VXLAN methodology can be implemented on some or all of the servers comprising a network and those servers on which it is implemented are typically referred to as VXLAN capable servers.

Another network virtualization technique is described in Network Working Group Internet Draft entitled "NVGRE: Network Virtualization using Generic Routing Encapsulation" published September 2011, the entire contents of which are incorporated herein by reference. This draft describes a Tenant Network Identifier (TNI) which is included in a header that envelopes or encapsulates an Ethernet frame generated by a NVGRE capable server in a network. GRE is a proposed IETF standard and is described in RFC 2784 and RFC 2890. Hereinafter, NVGRE capable and VXLAN capable servers are referred to as Network Virtualization (NV) capable servers, and VNI and TNI are referred to as a Virtual Network Segment Identifier (VNSI). The VNSI is included in a NVGRE header (outer header) that envelopes or encapsulates an inner Ethernet frame transmitted by a server (typically associated with a VM on a server). The outer NVGRE header is attached to an inner Ethernet frame by what is referred to as a NVGRE End Point (NVGRE-EP). The VXLAN and NVGRE headers are both referred to herein as a NV header. The VTEP and NVGRE-EP are both referred to her as an NV function, and the VN function is typically implemented in a hypervisor residing in a NV capable server.

Each NV-capable server (VXLAN or NVGRE) can be configured to support some number of virtual machines (VM) which are typically managed by a hypervisor function running on the server. Each virtual machine can be assigned a VNSI, and two or more VMs on the same or different servers can be assigned the same VNSI. Virtual machines running on NV-capable servers are only able to transmit and receive frames of information from VMs running on other NV capable servers if both VMs are assigned the same VNSI. More specifically, the hypervisor on each NV capable server builds a table (binding table) of information that associates VM addresses with physical server addresses on which the VMs are supported. In the case of a server, a binding table entry can include an association between the MAC address of a VM, such as the VM in NV capable server A of FIG. 1, and the IP address of the NV capable server A. Binding tables can be built and maintained by each NV capable server, and the information included in a binding table maintained by each NV capable server is typically distributed to all other NV capable servers in a local network, such as network 10 in FIG. 1. Also, the hypervisor in a NV capable server maintains a table that associates VMs with a VNSIs. This association can be performed manually by a network administrator, or more typically it can be performed by the hypervisor. In operation, when a source VM wants to send a frame to another, destination VM, a NV function running in the hypervisor examines the address of the source VM and the address of the destination VM which are included in the frame to be transmitted. The NV function then determines whether both VM addresses are members of the same VNSI, and if they are the NV function adds the NV header to the Ethernet frame and the frame is forwarded through the network to its destination. At the destination server, an NV function removes the NV header from the frame and the frame is delivered to the destination VM. Whereas, a frame generated by a first VM with one VNSI can't be transmitted to a second VM with another VNSI, the same frame can be sent by the first VM to another VM outside the virtual network.

In order to transmit Ethernet frames between NV-capable servers and non-NV-capable servers comprising a local network, it is necessary that a Gateway function be included at the interface between the virtualized portion of the network and the non-virtualized portion of the network. This Gateway functionality can be implemented on switches linked to the NV capable servers, or to switches not directly linked to NV capable servers, and is similar to the NV functionality running in a hypervisor on a physical server which was described earlier with reference to FIG. 1. Briefly, the Gateway function can operate to, among other things, identify packets that are encapsulated with a NV header, strip the VXLAN or NVGRE headers (collectively referred to here as NV header) from the packet if the packets destination is a non-NV capable device, and in the reverse direction, it can operate to attach a NV header to an Ethernet frame transmitted from a non-NV capable server to a NV capable server. Each network device that includes such a Gateway function can build and maintain a binding table similar to that built and maintained by a NV capable server. Information included in these binding tables can then be used by the Gateway function to identify packets that are encapsulated by a NV header and to determine how to forward them to their destination.

FIG. 1 illustrates a local network 10 topology in which the network virtualization methodologies described above can be implemented. The local network 10 (such as an Ethernet network) is comprised of one or more CORE switches, such as the aggregation switch 11, linked to two or more top-of-rack (TOR) switches TOR.0-TOR.n, each of which are in turn linked to a plurality of servers. Each of the servers can be configured as a NV capable server or configured without NV capability, which is referred to here as simply a "server", and both types of servers can be configured to support some number of VMs. Each of the TORs, TOR.0-TOR.n, and the one or more aggregation switches (AS.n) in FIG. 1 can include the Gateway function described above, and the switches generally operate to receive data frames from a neighboring network device and forward the frames to their destination, whether the destination is a server or another switch. Generally, when a source VM running on a NV-capable server, such as NV capable server A in FIG. 1, generates a data frame for transmission to a destination VM running on a NV-capable server, such as NV capable server B, and both of the VMs are assigned the same VNSI, an NV function running on the source server A attaches an outer NV header to an inner Ethernet frame and forwards the frame to the destination VM on the server B. The server B receives the Ethernet frame, and an NV function at the server strips the outer NV header and sends the inner MAC frame to the destination VM.

DETAILED DESCRIPTION

Figure 1:
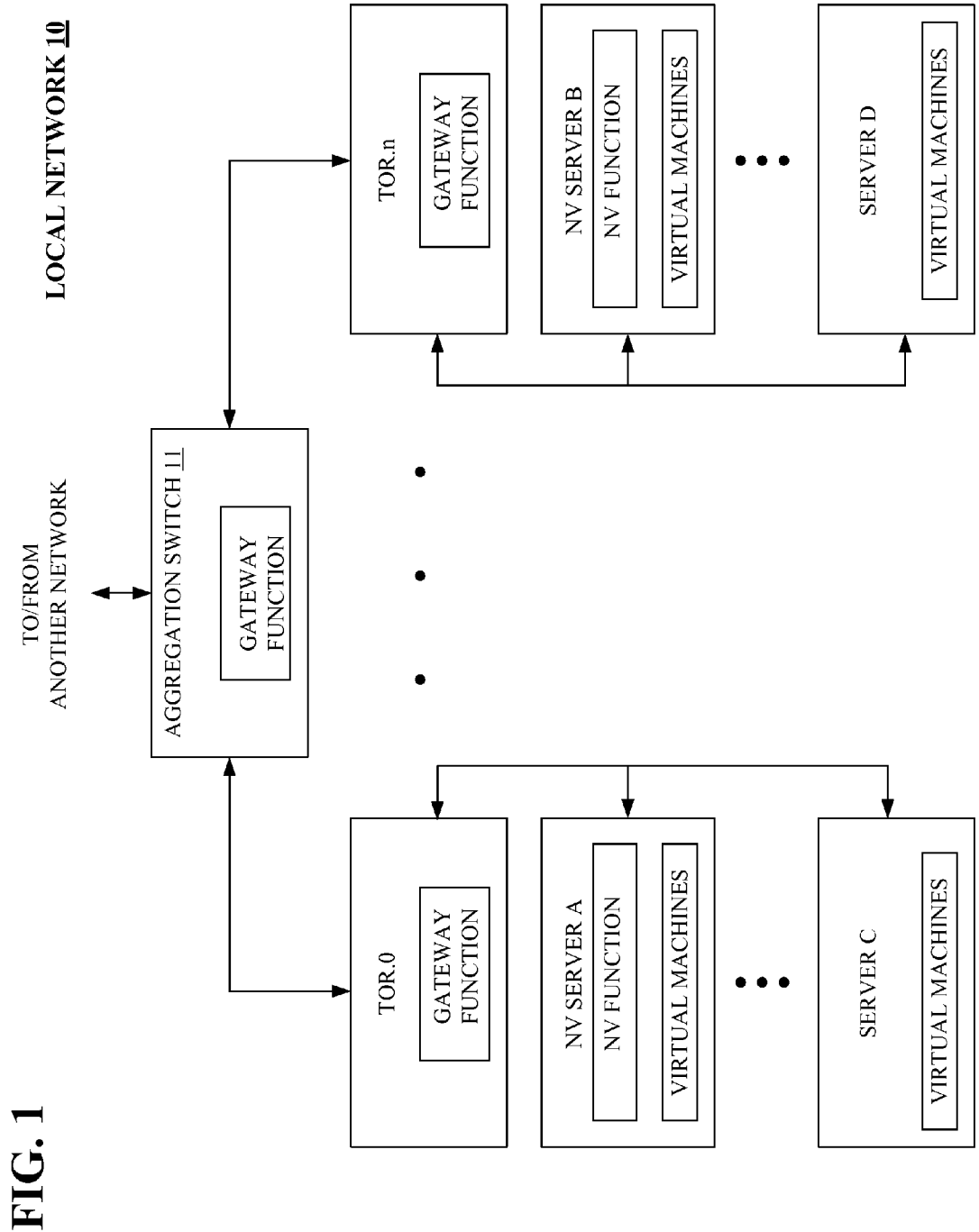
FIG. 1 is a diagram of a local network showing the location of NV capable servers, non-NV capable servers and Gateways.

As described earlier in the background section, in the event that an Ethernet frame is to be transmitted from a VM on a NV capable server A to a non-NV capable server C or to server D in FIG. 1, the Ethernet frame has to be processed by one or more of Gateway functions as it travels from the source server A to the destination server C or D. As explained earlier, the Gateway function operates to remove the outer NV header that encapsulates the inner Ethernet frame, thus permitting the non-NV capable server to process the frame. This Gateway functionality can be included in local network switches, such as the TOR and aggregation switches in FIG. 1, or it can be included in a hypervisor function that manages VM operation on a NV-capable server, or it can be included in some other device strategically placed in the local network. Regardless, the Gateway functionality is typically placed within the local network 10 so that communication between the NV capable and non-VN capable servers comprising the local network is not restricted. While the inclusion of this Gateway functionality permits NV capable servers to communicate with non-NV capable servers, the addition of this functionality in devices in a local network adds cost and adds additional complexity to the network.

It was discovered that, for Ethernet frames in which the source device is a VM running on a NV capable server, and the destination device is a VM running on a non-NV capable server (Server), the Gateway functionality is not necessary if the NV functionality is selectively deactivated during the transmission of these frames. From another perspective, it was discovered that if NV headers were not attached to Ethernet frames in which the source device is a VM running on a NV capable server, and the destination device is a VM running on a non-NV capable server (Server), then the Gateway functionality does not need to be implemented in an Virtualized Network.

Figure 2:
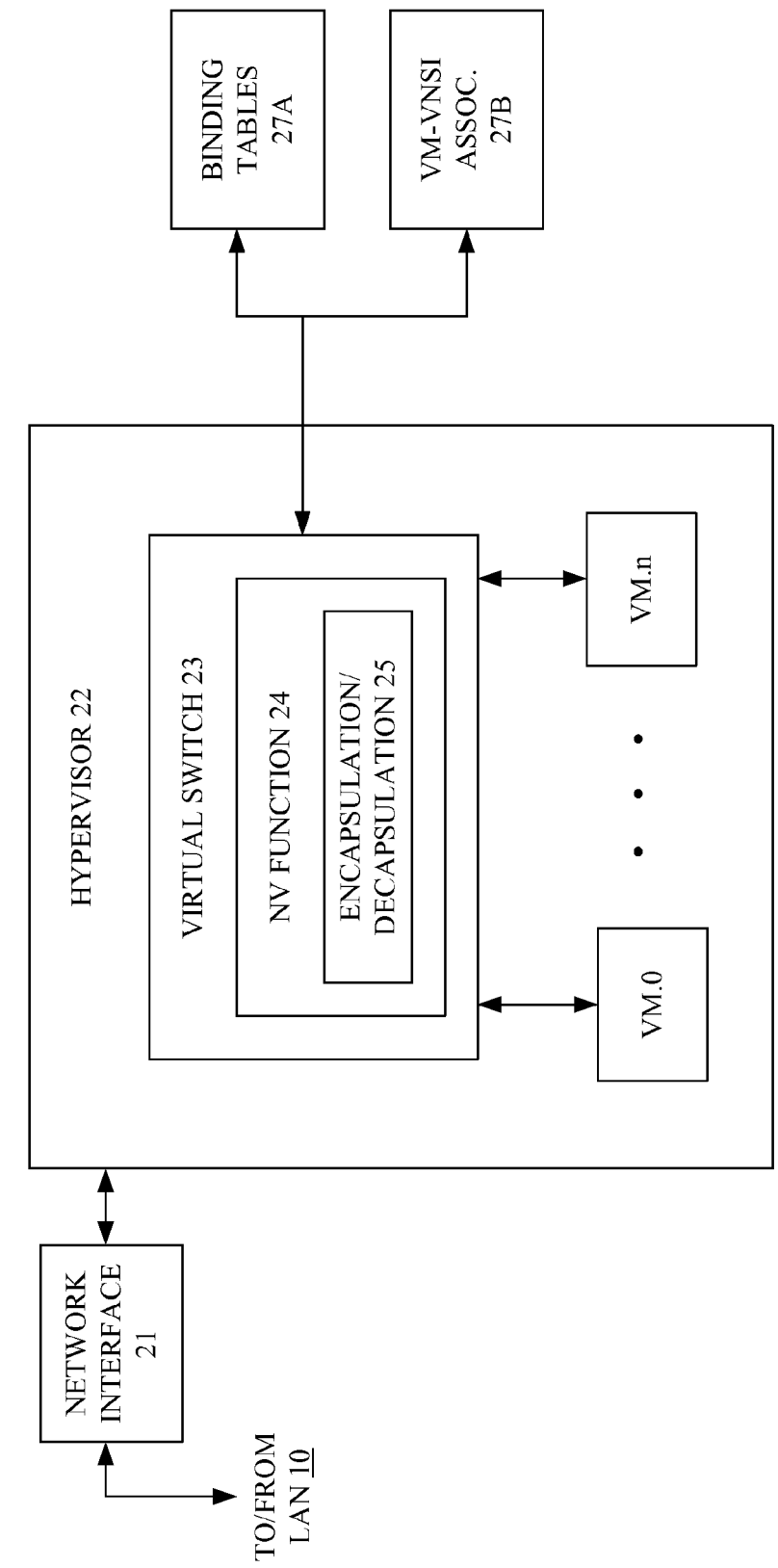
FIG. 2 is a block diagram showing the functional elements comprising NV server 20.

FIG. 2 is a block diagram of functionality that can comprise a NV capable server 20 in an embodiment of the invention. Server 20 is comprised of one or more network interface connections 21 (NIC), a hypervisor 22 and tables 27A and 27B for storing binding information and VM to VNSI associations respectively. The NIC 21 generally operates to control the transmission/reception of packets or frames of information to/from a local network, such as the local network 10 in FIG. 1. The hypervisor 22 is comprised of one or more a virtual switches (VS) 23 and a plurality of virtual machines, VM.0-VM.n, and it generally operates to, among other things, create and manage the VMs, to configure the one or more virtual switches and to assign the virtual switches to VMs, and to maintain a set of data objects in which the identity the VMs, virtual switches, and NICs are stored as well as the interconnections (configuration) between them. The VS 23 is comprised of a NV function 24 which includes, among other things, encapsulation/decapsulation functionality 25 and an encapsulation bypass functionality 26. The virtual switch 23 generally operates to transmit and receive data frames to/from the VMs using information included in the tables 27A and 27B. The binding tables 23A include information that correlates the VM addresses (MAC address) with the server 20 address (IP address), and this binding information can be gathered and the table build by the hypervisor running on the server. Each NV capable server builds a binding table that includes an entry for each VM that is associated with the server, and this table information is distributed to the other NV capable servers with which it can communicate. The VM-VNSI association table(s) 23B includes information that correlates the VNSI supported by the LAN 10 with the VMs on the servers comprising the LAN 10. As described previously, this correlation can be assigned manually or automatically by the hypervisor.

Continuing to refer to FIG. 2, in operation the VS 23 receives a data frame from any one of the VMs, VM0-VM.n, and examines the frame's Ethernet header to identify the MAC address of both the source the destination VMs. The VS can then use the MAC source and MAC destination address identified in the data frame as a key into the VM-VNSI table 27B to identify the VNSI of both the source and the destination VMs. If the destination and the source VM VNSIs match, then the VS 23 selects the encapsulation function 25 running in the NV function 24 which attaches a NV header and outer Ethernet header to the data frame and sends the frame to the NIC 21 for transmission to its destination. On the other hand, if the source and destination VM VNSIs are different (not members of the same segment), then according to both IETF drafts referenced in the background section, the frame would not be transmitted. However, and according to one embodiment, if the virtual switch determines that the address of a destination VM is not included in the binding tables (the destination device is not a NV capable server), then the VS 23 determines that the destination server/VM is not a NV capable server and the VS 23 does not select the encapsulation function 25. This prevents the NV header from being attached to the data frame and the frame is transmitted by the NV capable server in the normal manner without any special encapsulation information. As the data frame is transmitted without the special network virtualization encapsulation information, there is no need for the Gateway functionality described earlier with reference to FIG. 1. This results in the elimination of both cost and complexity from the network.

Figure 3:
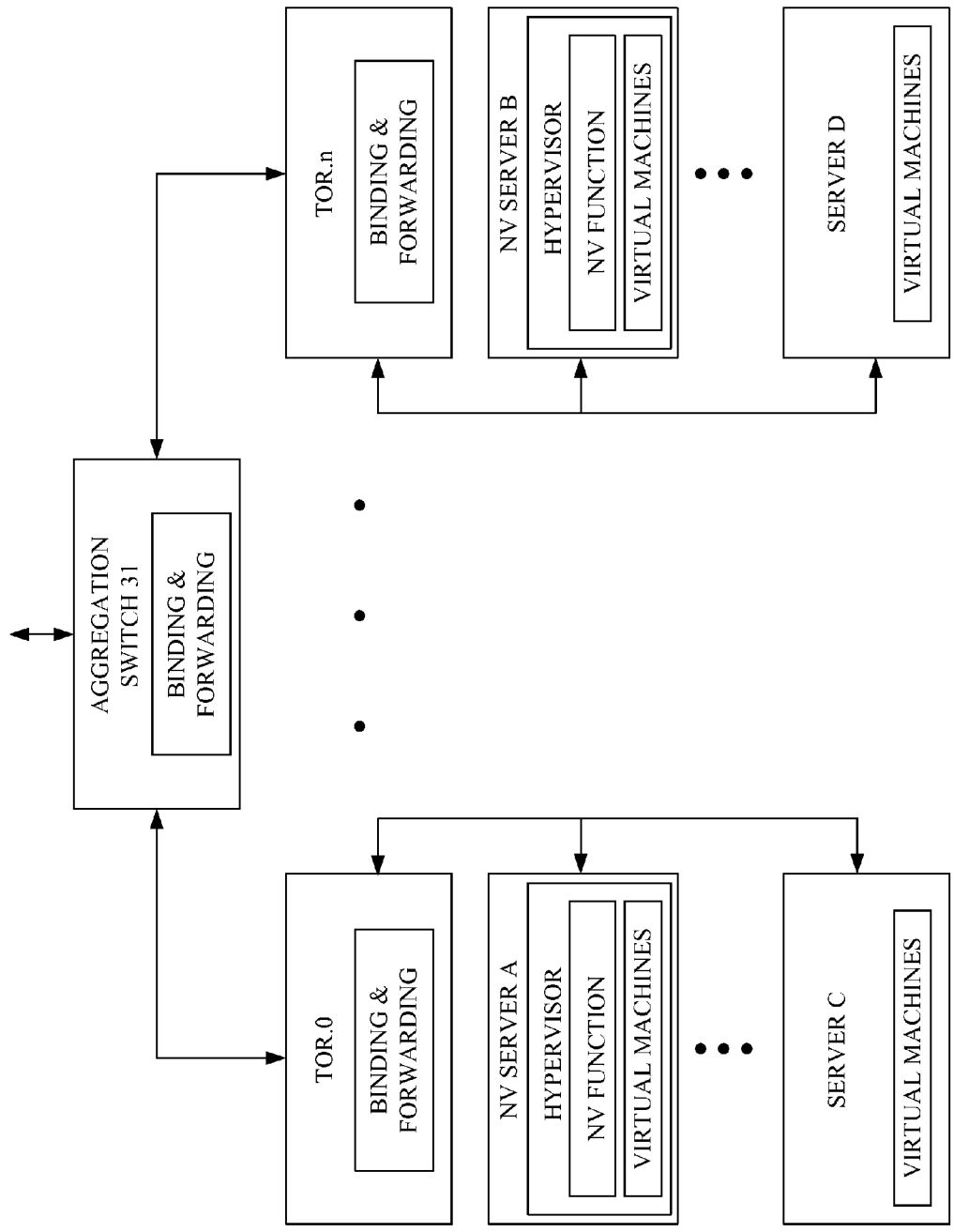
FIG. 3 is a diagram illustrating a local network 30 including switches, NV capable servers and non-NV capable servers.

FIG. 3 is a diagram of a local network 30, according to one embodiment, that does not include the Gateway functionality described earlier with reference to FIG. 1. As can be seen, the functional elements shown in FIG. 3 are similar in most respects to the functional elements shown in FIG. 1, with the noted difference being that the network 30 in FIG. 3 does not include the Gateway functionality. In order for the switches directly or indirectly connected to the NV capable server (TORs and/or Aggregation switch 31 in FIG. 3 for instance) to process the data frames transmitted from or destined for NV capable servers, it is necessary for each of these switches to have access to binding table information similar to that built and maintained by a NV capable switch, but which includes address information that the switch can use to forward the data frame to its destination.

Figure 4:
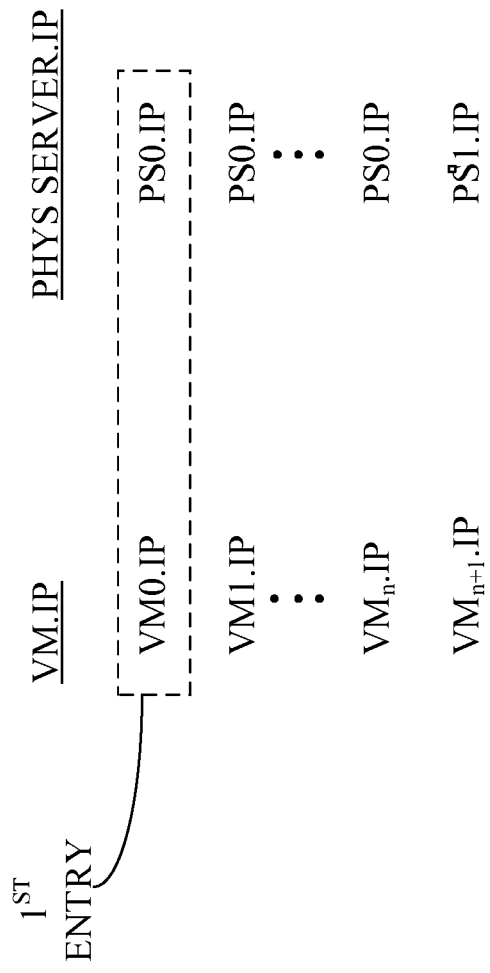
FIG. 4 illustrates the format of a binding table 40.

FIG. 4 illustrates the format of and information that can be included in a binding table 40 stored at a switch, such any of the switches comprising the local network 30 in FIG. 3. A first entry (and every other entry) in the binding table 40 is shown to include two elements, with the first element including the IP address of a VM and the second element including the IP address of the physical server on which the VM is running. With this binding table information and routing table information normally built and maintained by a switch, the next hop destination for a frame can be resolved. This binding table information can be generated using normal switch provisioning functionality, it can be learned from a hypervisor running on a physical switch or it can be discovered by a switch examining frame/packet header information. In this case, the PS IP address is used as a pointer into a layer-2 (ARP) table in order to resolve the destination VM.

Figure 5:
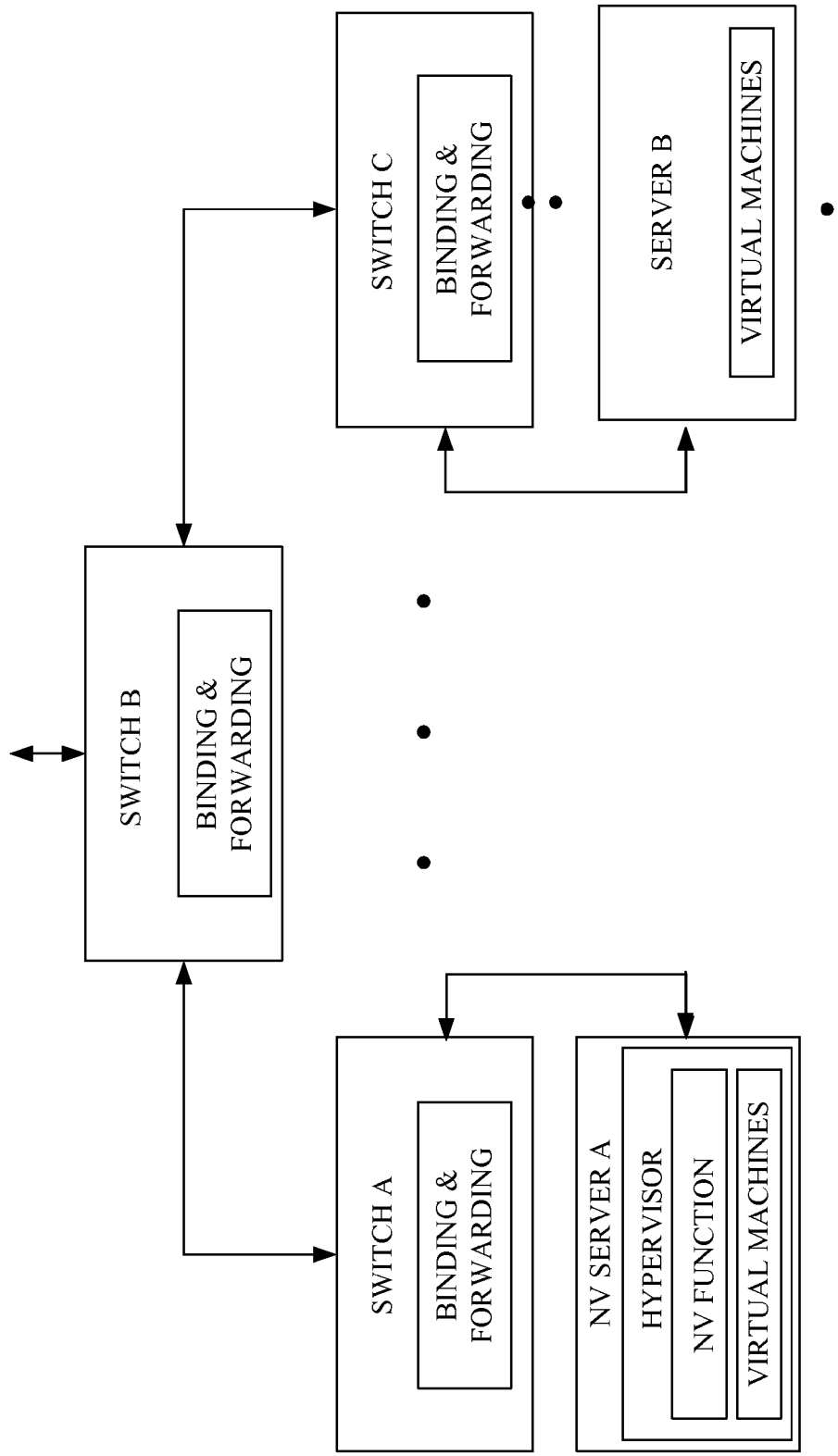
FIG. 5 illustrates a network 50 topology in which two switches are in the path of NV packets.

In the event that two switches are in the path between of a frame transmitted by a NV capable server to a non-NV capable server, it is necessary to propagate the binding information described above with reference to FIG. 4 from a switch that is directly linked to the NV capable server to a second switch that is indirectly linked to the NV capable server. FIG. 5 illustrates a local network 50 that is comprised of two servers, one NV capable server A and one non-NV capable server B (for the purpose of this description, only one physical server is shown linked to a switch, but there are typically many more physical servers connected to each of switches A and B) and switches A-C. In this case, a frame transmitted by a VM on the NV capable server A to a VM on non-NV capable server B is forwarded along its path by three switches, switches A-C. Each of these three switches needs to be able to access the binding information that can be discovered and maintained by switch A, in this case. Binding information discovered by switch A can be distributed to switches B and C by any one of a number of techniques. This can be performed using existing routing protocols such as OSPF for instance.

We claim:

1. A method of transmitting a data frame, comprising:
providing a first server that is capable of network virtualization and that is linked through a local network to a second server that is capable of network virtualization and a third server that is not capable of network virtualization;
receiving, by the first server from a first server virtual machine (VM) located on the first server, a data frame with a destination address; and
in response to the destination address of the data frame indicating that the data frame is being sent to a second server VM located on the second server that is capable of network virtualization, attaching a network virtualization header to the data frame and transmitting the data frame to the second server; and
in response to the destination address of the data frame indicating that the data frame is being sent to a third server VM located on the third server that is not capable of network virtualization, transmitting the data frame to the third server without attaching a network virtualization header to the data frame.

2. The method of claim 1 further comprising:
providing a switch in the local network that links the first server and to the third server that is not capable of network virtualization;
receiving, by the switch from the first server, the data frame;
resolving a next hop for the data frame using the switch such that the data frame is transmitted to the third server.

3. The method of claim 1, further comprising:
building, by the first server, a binding table that includes a plurality of entries, each entry including a VM address associated with a VM located on the first server and a physical address of the first server; and
distributing the binding table by the first server to the third server.

4. The method of claim 1, wherein the server includes a virtual machine-virtual network segment identifier (VM-VNSI) table correlating a VNSI supported by the local network with VMs located on the servers in the local network, and wherein the method further includes:
determining, by the first server using the VM-VNSI table, that the destination address of the data frame corresponds to the second server VM on the second server that is correlated with a VNSI that is correlated with the first server VM and, in response, attaching the network virtualization header to the data frame and transmitting the data frame to the second server; and
determining, by the first server using the VM-VNSI table, that the destination address of the data frame corresponds to a destination VM on the third server that is correlated with a VNSI that is not correlated with the first server VM and, in response, transmitting the data frame to the third server without attaching a network virtualization header to the data frame.

5. The method of claim 1, further comprising:
providing a plurality of switches in the local network that link the first server and to the third server;
discovering, by a first switch of the plurality of switches, binding information correlating servers in the local network with VMs located on those servers; and
distributing the binding information to each of the other switches in the plurality of switches.

6. The method of claim 5, wherein the first switch is directly linked to the first server and discovers the binding information from the first server, and the at least one second switch is indirectly linked to the first server through at least the first switch.

7. The method of claim 1, wherein the local network is a data center.

8. A method of operating a network virtualization capable server linked to a local network, comprising:
  associating a physical network address assigned to a network virtualization capable server with a plurality of virtual network addresses associated with virtual machines (VMs) located on the network virtualization capable server;
  associating a first virtual network segment identifier (VNSI) with at least one of the plurality of virtual network addresses associated with the network virtualization capable server;
  generating a data frame and determining a second VNSI that is associated with a destination virtual network address included in the data frame; and
  in response to determining that second VNSI is the same as the first VNSI, encapsulating the data frame with a network virtualization header and transmitting the data frame to the local network; and
  in response to determining that second VNSI is different than the first VNSI, transmitting the data frame to the local network without encapsulating the data frame with a network virtualization header.

9. The method of claim 8, wherein the association of the physical network address and the plurality of virtual network addresses includes at least one binding table.

10. The method of claim 8, wherein the physical network address includes is an source IP address and the plurality of virtual network addresses include source medium access control (MAC) addresses.

11. The method of claim 8, wherein the VNSI is one of a VXLAN identifier and a network virtualization generic routing encapsulation identifier.

12. The method of claim 8, wherein the network virtualization header is comprised of a virtual network segment identity.

13. The method of claim 8, wherein the local network is a data center.

14. A data frame transmission system, comprising:
  a first server including:
    a network interface connecting the first server to a local network;
    a non-transitory, computer readable memory for storing one or more binding tables and virtual machine to virtual network segment identity (VM-VNSI) association information; and
    a hypervisor configured to:
      manage the operation of a plurality of first server virtual machines located on the first server;
      determines a destination address from a data frame generated by one of a plurality of virtual machines; and
      in response to the destination address of the data frame indicating that the data frame is being sent to a second server VM located on a second server on that is connected to the local network and that is capable of network virtualization, encapsulate the data frame with a network virtualization header and transmit the data frame to the second server; and
      in response to the destination address of the data frame indicating that the data frame is being sent to a third server VM located on a third server that is connected to the local network and that is not capable of network virtualization, transmit the data frame to the third server without encapsulating the data frame with a network virtualization header.

15. The data frame transmission system of claim 14, wherein the hypervisor includes a virtual switch that operates to manage the transmission of data frames to and from the plurality of first server virtual machines.

16. The data frame transmission system of claim 15, wherein the one more binding tables include binding information correlating servers in the local network with VMs located on those servers, and the VM-SNSI association information correlates a VNSI supported by the local network with VMs located on the servers in the local network.

* * * * *